United States Patent Office 3,484,428
Patented Dec. 16, 1969

3,484,428
CATALYST TREATED WITH BORON COMPOUND PRIOR TO ACTIVATION
Lyle R. Kallenbach, College Station, Tex., assignor to Phillips Petroleum Company, a corporation of Delaware
No Drawing. Filed Sept. 29, 1966, Ser. No. 583,098
Int. Cl. C08c 3/04
U.S. Cl. 260—94.9           7 Claims

ABSTRACT OF THE DISCLOSURE

A catalyst is prepared by forming an intimate mixture of (1) a support or base of one of the group silica, alumina, zirconia, and thoria, and combinations thereof, (2) a chromium compound convertible to chromium oxide upon calcination, and (3) at least one boron compound of the group boranes and alkyl-substituted boranes, and activating the resulting mixture by heating same in an oxygen-containing, nonreducing ambient at a temperature in the range of 750 to 1800° F. for at least ½ hour.

---

This invention relates to a process for polymerizing polymerizable olefins to polymers of narrow molecular weight distribution and to a catalyst for effecting the process.

As indicated in Modern Plastics Encyclopedia, 1965, page 244, a number of properties of polyethylene, including impact strength, brittleness temperature, and melt extensibility, are improved by narrowing of the molecular weight distribution. In my copending application Ser. No. 509,154, filed Nov. 22, 1965, narrowing of polymer molecular weight distribution is effected by the addition of fluoroborates to the chromium oxide catalysts of the Hogan and Banks patent, U.S. 2,825,721.

Peters et al., U.S. Patent 2,898,326, disclose the addition of certain boron hydrides and alkyls to a reaction mixture containing supported chromium oxide catalyst for the polymerization of olefins. The boron compounds are added to the chromium oxide catalyst after activation of the composite of chromium oxide and its base or support.

I have found that the process of U.S. 2,898,326 actually results in a broadening of molecular weight distribution. It was, therefore, surprising and completely unexpected to find that the addition of the boron compound to the supported chromium oxide catalyst before activation of the catalyst results in a substantial narrowing of molecular weight distribution.

One indication of molecular weight distribution is the ratio of high-load melt index (HLMI) to regular melt index (MI) as determined by ASTM D–1238–62T (conditions F and E, respectively). A lower value for this ratio at a given melt index is indicative of a narrower molecular weight distribution. This ratio is sometimes referred to as shear response.

Accordingly, it is an object of the invention to provide a novel catalyst for the polymerization or copolymerization of polymerizable olefins, particularly 1-olefins of relatively low molecular weight, such as $C_2$ to $C_8$ olefins including ethylene, propylene, butene-1, hexene-1, octene-1, and the like. Another object is to provide a process for the polymerization or copolymerization of polymerizable olefins to produce polymers of narrower molecular weight distribution than are produced with the conventional supported chromium oxide catalysts of U.S. 2,825,721 or the modified catalysts of U.S. 2,898,326 under comparable process conditions. A further object is to provide a process for homopolymerizing ethylene to produce a homopolymer of narrow molecular weight distribution. Other objects of the invention will become apparent to one skilled in the art upon consideration of the accompanying disclosure.

A broad aspect of the invention comprises polymerizing a polymerizable olefin under polymerizing conditions, utilizing a catalyst composite prepared by impregnating or mixing a base or support of at least one of the group silica, alumina, zirconia, and thoria with a chormium compound convertible to chromium oxide upon calcination and at least one boron compound of the group boranes and alkyl-substituted boranes, and heating and activating both the boron and chromium compounds of the resulting composite on the support in an $O_2$-containing ambient for ½ to 50 or more hours at a temperature in the range of about 750–1800° F., preferably 1000 to 1500° F., to leave a substantial portion of the chromium oxide in hexavalent form. The resulting polymer formed in the presence of this catalyst has a substantially narrower molecular weight distribution than is obtained under comparable conditions without the activation of the boron compound and chromium oxide on the support or by adding the boron compound to the reaction zone to contact a previously activated supported chromium oxide catalyst.

The boron compounds effective in the process include the boranes (or boron hydrides), i.e., diborane, tetraborane, pentaborane, hexaborane, decaborane, dodecaborane, etc., and alkyl boranes (or alkyl-substituted boranes), i.e., triethylborane, tributylborane, trihexylborane, tridodecylborane, tetraethyldiborane, diheptyldiborane, nonamethylpentaborane, dodecyldodecaborane, tetrahexylpentaborane, tetradecyldecaborane, tetradecapropyldecaborane, dimethyltetraborane, decadecylhexaborane, etc. The alkyl groups in the substituted boranes are preferably limited to those having not more than 12 carbon atoms.

The boron compound is usually used in a concentration in the range of 0.1 to 3 weight percent of the supported chromium oxide catalyst but concentrations outside of this range can be used but less advantageously. It is essential to the invention to impregnate the support with the boron compound before activating the chromium oxide-support combination. Any order of incorporating the boron and chromium compounds in the support may be followed. The porous support may be impregnated with a solution (water or organic liquid) of the chromium compound, preferably chromium trioxide, followed by drying the resulting composite at relatively low temperature, such as 250–325° F. (without activating the resulting composite) and thereafter adding the boron compound to the composite either as such or in an organic solvent, such as toluene or pyridine. Another method of forming the composite catalyst comprises forming an intimate mixture of the support and chromium and boron compounds followed by heating and activating the support at a temperature in the range of about 750–1800° F. Regardless of the method of combining the three catalyst constituents, this heating and activating step after the three constituents are mixed is essential to the process.

The following specific examples illusrate the invention but are not to be construed as unnecessary limiting the same.

EXAMPLE

The catalysts used in the runs in Table I below were made using a microspheroidal silica base containing 0.1 weight percent alumina and having an average pore diameter of about 225 A, and were all activated in dry air for 5 hours at 1150–1200° F. The base catalyst was made by impregnating the silica base with sufficient aqueous chromium trioxide solution to give a $CrO_3$ content of 1.9 weight percent, and drying at 300° F. (catalyst A).

One weight percent decaborane ($B_{10}H_{14}$) was either mixed in powdered form with the catalyst before activation (process of the invention) (catalyst B), or added to the reactor after catalyst addition (process of U.S. 2,898,326) (catalyst C).

The polymerization runs were made in a 1.3-liter stirred reactor using the following technique: The reactor was warmed and flushed with dry nitrogen, and about 0.1 gram of catalyst—suspended in 340 grams of a hydrocarbon reaction medium containing about 85 weight percent cyclohexane and 15 percent substituted cyclopentanes and branched heptanes—was charged. The reactor was heated to 285° F. and ethylene was added as required to maintain a pressure of 450 p.s.i.g. for 1 hour. Data obtained are presented in Table I.

TABLE I

| Catalyst | Run No. | Productivity, lb./lb. catalyst | Melt index | | |
|---|---|---|---|---|---|
| | | | HLMI | MI | HLMI/MI |
| A | 1 | 1,135 | 364 | 11.3 | 32 |
| A | 2 | 870 | 440 | 14.2 | 31 |
| B | 3 | 700 | 505 | 23.1 | 22 |
| B | 1 4 | 500 | 874 | 41.5 | 21 |
| C | 5 | 270 | 361 | 8.2 | 44 |

[1] Temperature=300° F.

It is apparent that use of the catalyst of the invention results in an HLMI/MI ratio considerably below that obtained with the base catalyst, and that addition of the decaborane to a reaction zone containing chromium oxide-silica-alumina in accordance with the process of U.S. 2,898,326 results in both a marked decrease in yield and an increase in HLMI/MI ratio, i.e., a broadening of molecular weight distribution.

The foregoing runs clearly demonstrate the superiority of a catalyst of the invention over the other two catalysts tested with respect to the production of solid polymer of narrow molecular weight distribution from ethylene.

Certain modifications of the invention will become apparent to those skilled in the art and the illustrative details disclosed are not to be construed as imposing unnecessary limitations on the invention.

I claim:

1. A catalyst prepared by forming an intimate mixture of (1) a support or base of one of the group silica, alumina, zirconia, and thoria, and combinations thereof, (2) a chromium compound convertible to chromium oxide upon calcination, and (3) at least one boron compound of the group boranes and alkyl-substituted boranes in which the alkyl group contains 1 to 12 carbon atoms, and activating the resulting mixture by heating same in an oxygen-containing, non-reducing ambient at a temperature in the range of 750 to 1800° F., for at least ½ hour to leave a substantial portion of the chromium in the hexavalent state.

2. The catalyst of claim 1 including silica-alumina, chromium trioxide, and borane.

3. A process for making narrow molecular weight distribution polymers of polymerizable olefins which comprises polymerizing at least one of said olefins under polmerizing conditions with the catalyst composite of claim 1 and recovering a polymer of narrow molecular weight distribution.

4. The process of claim 3 wherein said catalyst is a composite of silica-alumina impregnated with a solution of $CrO_3$ and said boron compound.

5. The process of claim 3 wherein said catalyst is a composite of silica-alumina impregnated with a solution of $CrO_3$ and said boron compound is a decabornane.

6. The process of claim 3 wherein said catalyst is a composite of silica-alumina, chromium trioxide, and a borane, and said olefin is principally ethylene.

7. The process of claim 3 wherein said catalyst is a composite of silica-alumina, chromium trioxide, and an alkyl borane, and said olefin is principally ethylene.

References Cited

UNITED STATES PATENTS

| 2,825,721 | 3/1958 | Hogan et al. | 260—94.9 |
| 2,892,826 | 6/1959 | Peters et al. | 260—93.7 |
| 2,989,326 | 8/1959 | Peters et al. | 260—94.9 |
| 2,944,049 | 7/1960 | Edmonds | 260—94.9 |
| 3,130,188 | 4/1964 | Hogan | 260—94.9 |
| 3,165,504 | 1/1965 | Hogan | 260—94.9 |
| 3,166,536 | 1/1965 | Witt | 260—94.9 |

JOSEPH L. SCHOFER, Primary Examiner

E. J. SMITH, Assistant Examiner

U.S. Cl. X.R.

252—430, 432; 260—88.2, 93.7